Feb. 15, 1927.  
R. BERINGER  
1,617,367  
BINDING STRIP FOR RUNNING BOARD TREADS  
Filed May 25, 1923
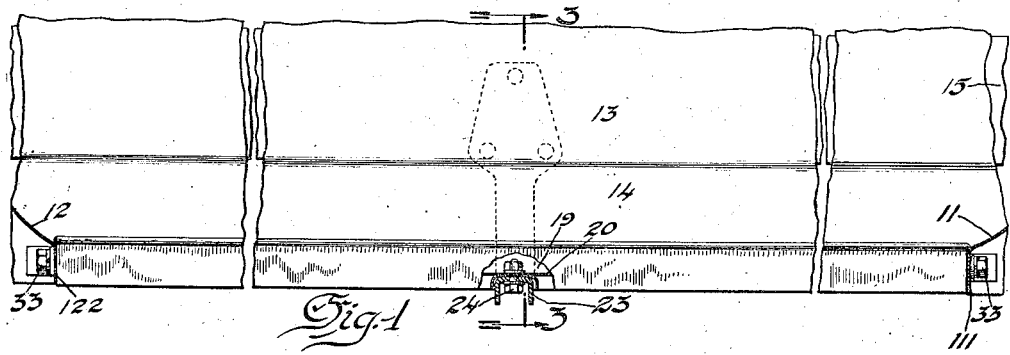
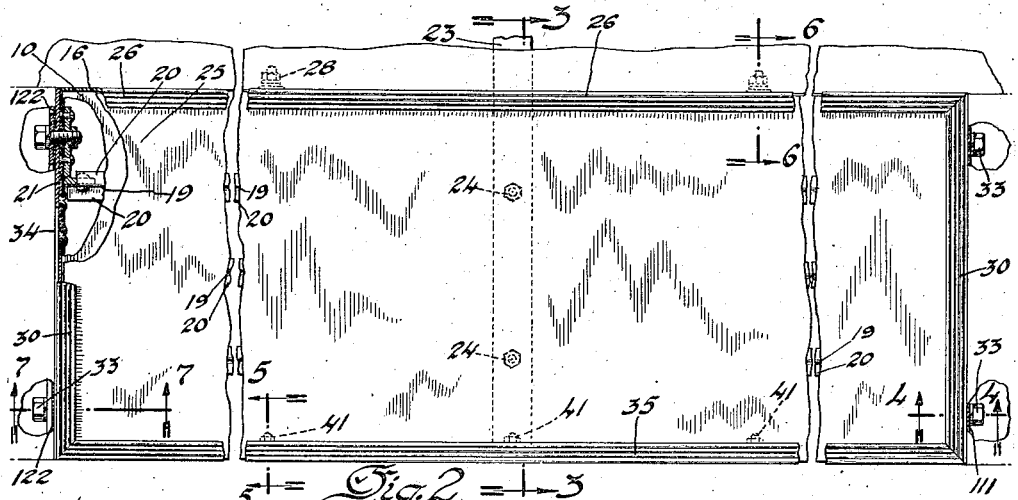
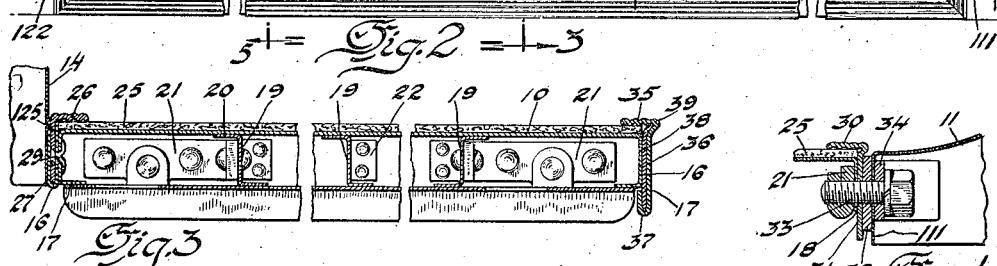
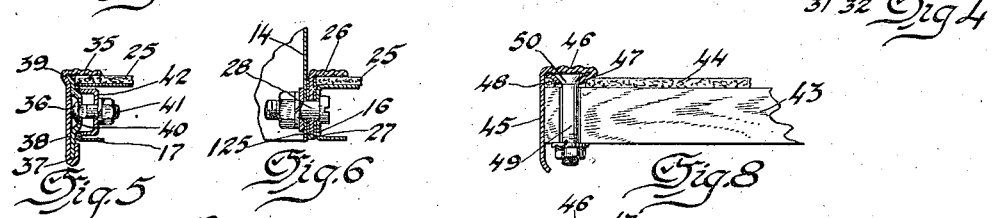
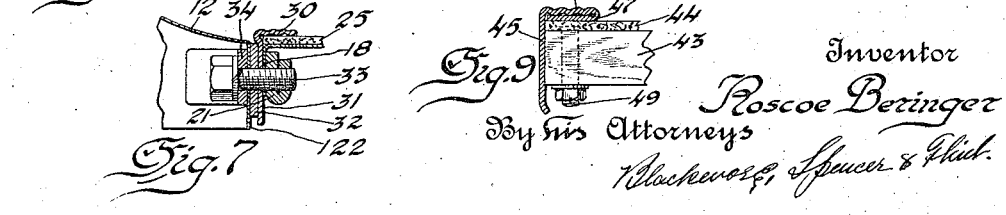
Inventor  
Roscoe Beringer  
By his Attorneys Patented Feb. 15, 1927.

1,617,367

UNITED STATES PATENT OFFICE.

ROSCOE BERINGER, OF DETROIT, MICHIGAN, ASSIGNOR TO GENERAL MOTORS CORPORATION, OF DETROIT, MICHIGAN, A CORPORATION OF DELAWARE.

BINDING STRIP FOR RUNNING-BOARD TREADS.

Application filed May 25, 1923. Serial No. 641,446.

My invention relates to the running boards of automobiles and similar self-propelled vehicles, such running boards extending longitudinally at the sides of the vehicle and constituting an elongated step to enable the driver or passengers to enter and leave the vehicle body conveniently.

Running boards of motor driven and similar vehicles are ordinarily provided with an upper surface or layer of non-metallic resilient material similar in many respects to the material ordinarily known as "linoleum", or with a sheet of rubber or equivalent non-metallic surface, the purpose of the tread or mat thus provided being to prevent slipping of a person entering or leaving the vehicle and provide a better appearing running board than one having an exposed upper surface of metal throughout; and the principal object of my invention is to provide an improved molding or binding strip adapted to extend along an edge and, ordinarily, about the periphery of the running board and of the non-metallic tread portion or facing thereof, and which strip acts to hold the edges of said facing or tread in engagement with the periphery of the running board, and thus hold the tread itself properly assembled with the running board.

A further object of my invention is to provide an improved molding strip and holding down member for the periphery of the non-metallic tread whereby the tread will be held properly assembled with the running board by fastening members which are concealed, so that the surface of the running board and of the molding strip which is visible from outside the vehicle is smooth and continuous throughout; thus presenting a more pleasing appearance than would be the case if the tread were held in place, for example, by fastening members the heads of which were visible.

With the above and other objects of invention in view, my invention consists in the improved binding and tread securing strip illustrated in the accompanying drawing and hereinafter described and explained; and such variations and modifications thereof, within the scope of the concluding claims, as will be obvious to those skilled in the art to which my invention relates.

In the drawing accompanying and forming a part of this specification and wherein the preferred embodiment of my invention is illustrated:

Figure 1 is a fragmentary view showing the lower portion of the body of an automobile, and the running board associated therewith, in side elevation; the latter being equipped with a binding and holding down strip for the mat or tread thereof made in accordance with my invention.

Figure 2 is a view similar to Figure 1 but showing the parts in plan; this view as well also as Figure 1 being broken away in parts to better show various features of the invention.

Figure 3 is a view showing a section upon a vertical transverse plane indicated by the line 3—3, Figures 1 and 2.

Figure 4 is a fragmentary view showing a section at the front end of the running board and rear end of the front wheel fender, upon a vertical longitudinal plane indicated by the line 4—4, Figure 2.

Figure 5 is a fragmentary view showing a section through the outer exposed edge of the running board, together with my improved tread holding strip and molding, upon a vertical transverse plane indicated by the line 5—5, Figure 2.

Figure 6 is a fragmentary view upon a vertical transverse plane indicated by the line 6—6, Figure 2, showing a section at the inner side or edge of the running board where it is connected with the usual dust shield, the tread surface or mat of the running board being held in place by my improved molding strip.

Figure 7 is a fragmentary view showing a section at the rear end of the running board and front end of the rear fender which is fastened to said rear end, the figure being upon a vertical longitudinal plane indicated by the line 7—7, Figure 2.

Figures 8 and 9 are fragmentary sectional views showing a modified form of my improved holding strip and molding designed especially for use in connection with wooden running boards.

Referring now to the drawing, the running board with which my invention is shown as used in Figures 1 to 6 inclusive comprises a plate 10 made of sheet metal of the proper thickness and which running board extends between the front and rear fenders and is fastened to them and to the body of the vehicle; the rear end of the front fender being indicated by the numeral 11, and the front end of the rear fender by the numeral 12. This running board is obviously of sufficient width to afford a firm foothold for the driver or occupant in entering or leaving the vehicle, the body portion of which is designated by the numeral 13; and the running board illustrated is shown as used in connection with the usual dust shield 14 the upper edge of which is secured along the joint between the under side of the body and the frame 15 of the vehicle, and the lower edge of which is secured along the rear edge of the running board.

The side edges of the sheet of metal from which the running board is formed are bent downward, as indicated at 16—16, and inward as shown at 17—17, to thereby provide channels at said edges and increase the strength and stiffness of the board structure; and the front and rear ends of the metal from which the running board is formed are bent downward to provide flanges 18—18 adjacent the ends of the front and rear fenders to facilitate the fastening of the ends of the running board to the fenders.

The running board being as will be appreciated of considerable area, and of slight thickness, is strengthened by a sufficient number of longitudinally extending sills designated by the reference numeral 19; these sills being arranged edgewise, and having flanges 20 at their upper and lower sides for increasing their strength and providing a proper bearing for the running board, as will be appreciated. The front and rear ends of these sills are held in fixed relation to the running board in any suitable way as by means of right angular brackets 21 secured to the front and rear depending flanges 18, or directly to the said flanges as shown at 22 in Figure 3; and said running board is supported from the side bars 15 of the frame by a suitable number of brackets depending therefrom and having horizontal supporting portions 23 extending laterally beneath the sills 19 and fastened to the lower flanges 20 of said sills as by means of suitable bolts 24.

The upper surface of the running board is covered by a non-metallic facing 25 made from any suitable material such, for example, as sheet cork composition commonly referred to as linoleum, or from a molded rubber or equivalent material composition; the purpose of the mat or tread surface thus provided being to provide a firm foot hold for one entering or leaving the body of the vehicle to prevent slipping at such times, and to provide a more pleasing appearance for the running board than would be the case if the exposed surface thereof was of metal. This layer or facing overlies the upper side of and extends throughout the entire area of the running board and the periphery thereof is fastened to the periphery of the running board by my improved binding strip or molding, which in the embodiment of my invention illustrated extends about said periphery and holds the same in place relative to the edge of the running board; and in addition providing a finished edge for the mat or tread thus provided and prevents the same from becoming frayed or injured, as it will be appreciated that the same is made from a comparatively brittle material.

My improved binding and edge holding strip is shown as of various forms according to whether it is intended for use in holding the front and rear ends and the inside edge of the tread to the running board, or for holding the outer side or edge thereof which extends along the outer exposed side of the running board to the corresponding edge of the running board.

The binding strip for fastening the inside edge of the non-metallic tread to the running board is shown as comprising a vertically extending portion or wall 125, and an upper horizontal corrugated portion 26 which overlies the rear edge of the tread 25 when the parts are assembled, as best shown in Figure 3. Extending longitudinally of and enclosing the depending portion 125 is a folded or U-shaped non-metallic packing strip 27 the sides of which lie between said depending portion and the inside depending flange 16 of the running board, and between said depending portion and the lower edge of the dust shield 14; the purpose of said packing strip being to avoid a metal to metal contact between the parts at the place in question and thereby prevent rattling or squeaking, due to relative movement between said parts. The inside edge of the running board and the lower edge of the dust shield 14 are fastened together by bolts 28, as shown in Figure 6, with the depending portion 125 of the inside holding strip and the sides of the U-shaped packing strip interposed between said parts, as illustrated in said figure. When thus assembled the upper portion 26 of the binding strip overlies the rear edge of the tread 25 and holds it in proper position upon the upper surface of the running board; and the corrugations formed in said overlying portion provide for a more secure grip along the edge of the non-metallic tread, and provide also a construction having a more pleasing appearance than would otherwise be the case. The portions of the binding strip intermediate adjacent bolts 28 may be secured to the depending side edges 16 of the running board by rivets 29; as many bolts 28 and rivets 29 being employed as may be deemed necessary in any particular case.

The binding strips at the front and rear ends of the non-metallic tread have corrugated upper portions 30 which overlie and hold the front and rear ends of the tread to the running board, and depending portions 31 which extend down between the depending end flanges 18 of the running board and similar depending portions 111 and 122 of the front and rear fenders. Suitable packing strips 32 are provided between the binding strip and said depending portions to prevent rattling or squeaking; and the ends of the running board and the adjacent ends of the fenders are held together by bolts 33 having nuts and washers, as best shown in Figures 4 and 7, suitable strips 34 being preferably employed to reinforce the edges of the fenders, as will be appreciated.

The outer side or edge of the non-metallic tread or facing for the running board is held in place along the outer edge of the board by means of a binding and holding strip of somewhat different construction than the strips above referred to; the same comprising an upper horizontal corrugated portion 35, and a depending portion 36 which forms the outer exposed surface of the outer holding strip when the same is in use. The lower edge of the outer portion 36 is turned inward, as indicated at 37; and the reference numeral 38 designates a fastener carrying strip extending along the depending portion 36 and the lower end of which is held in place by the inturned portion 37 engaging the lower end of said strip, as shown in Figures 3 and 5. The upper end of this strip extends into a groove or bead, as shown at 39, formed in the corner between the horizontal portion 35 and the vertical portion 36 of the binding strip in question; whereby as will be appreciated the fastener carrying strip reinforces the binding and edge holding strip throughout its entire length.

The strip 38 is provided with depressions 40 spaced along the same for receiving the heads of fastening bolts 41, which fastening bolts extend through cup-shaped spacers or washers 42 surrounding the depressions 38 and the bases of which washers bear upon the inner side of the longitudinally extending depending flange 16 of the running board; said flange having openings of sufficient diameter to permit the depressions 40 to enter thereinto so that the fastener carrying strip will bear against said flange between the bolts and throughout practically its entire area, all as will be understood from Figure 5 of the drawing.

Figures 8 and 9 show a form of my improved binding strip for the tread of a running board adapted for use in connection with wooden running boards; these views showing the binding strip which extends along the outer edge of the running board. In these figures the reference numeral 43 designates the running board which is very much thicker than the running board hereinbefore referred to, as the same is assumed to be made from wood; while the numeral 44 designates the composition tread overlying the upper surface of the running board.

This form of my improved binding strip comprises a vertically extending portion 45 extending along the outer edge of the running board, and preferably some little distance below the same to conceal the nuts of the bolts which fasten the strip to the board. The strip of metal from which the binding strip is formed has an inwardly extending corrugated top portion 46, and a fastener carrying portion 47 lying beneath the portion 46; the portions 47, 46 and 45 being integral with one another and formed from a suitable strip of metal by bending and turning the parts into proper relation with one another. The fastener carrying portion is provided with depressed or countersunk openings 48 spaced along its length; these openings being provided and the fastening bolts being assembled therewith before the strip is bent and folded into its final form shown, as will be appreciated.

The reference numerals 49 designate bolts for holding the binding strip as a whole in assembled relation with the running board with the corrugated exposed surface 46 thereof above the edge of the tread 44, the heads 50 of said bolts lying within the depressions 48 and being covered by said corrugated portion, as will be understood from Figure 8.

It therefore follows that when the parts are assembled the outer exposed surface 45 of the binding strip conceals the outer edge of the running board 43, and extends downward below the under side thereof so as to conceal the nuts of the bolts 49, the horizontal corrugated portion 46 of the strip as a whole overlies the outer edge of the composition or other non-metallic tread 44, while the heads of the bolts which fasten the parts together are held within the depressions 48 of the fastener portion 47 of the molding and are thus concealed.

Having thus described and explained my invention I claim and desire to secure by Letters Patent:

1. In combination with the running board of a vehicle, and a mat or tread overlying the upper surface of said board; a binding strip extending along an edge of said board and comprising a vertical portion, and a horizontal portion overlying the edge aforesaid and the corresponding edge of said tread, and extending over and engaging the upper side of said tread along said edge; a fastener carrying strip assembled with and extending throughout the length of the vertical portion aforesaid of said binding strip; and a plurality of fasteners carried by said fastener carrying strip and whereby said binding strip may be secured along the edge aforesaid of said running board.

2. A binding strip for holding the side edge of a tread to a running board, the same comprising a vertical portion, and a horizontal portion at the upper end of said vertical portion; a fastener carrying strip assembled with and overlying the vertical portion of said binding strip; and a plurality of fastening bolts carried by said fastener carrying strip and whereby the same may be fastened to a running board.

3. A binding strip for holding the free edge of a tread in engagement with a running board and for protecting the same, said strip comprising a vertically extending portion, and a horizontal portion at the upper end of said vertically extending portion; a fastener carrying strip assembled with and extending along the entire length of the vertical portion aforesaid, and the upper edge of which extends along and is retained in place within the angle between said vertical and horizontal portions, and the lower edge of which is held in engagement with the vertical portion aforesaid by an inwardly and upwardly turned flange at the lower edge of said vertically extending portion; and a plurality of attached bolts carried by and spaced along said fastener carrying strip, and the heads of which are concealed by the vertically extending portion aforesaid of said binding strip.

4. A binding strip for holding the free edge of a tread in engagement with a running board and for protecting the same, said strip comprising a vertically extending portion, and a horizontal portion at the upper end of said vertically extending portion; a fastener carrying strip assembled with and overlying the inner side of the vertical portion aforesaid, and the upper edge of which extends along and is retained in place within the angle between said vertical and horizontal portions, and the lower edge of which is held in engagement with the vertical portion aforesaid by an inwardly and upwardly turned flange at the lower edge of said vertically extending portion, and which fastener carrying strip is provided with a series of depressions spaced along the same; and a plurality of bolts extending through holes provided in said depressions and the heads of which lie within said depressions, and are concealed by the vertically extending portion aforesaid of said binding strip.

In testimony whereof I affix my signature.

ROSCOE BERINGER.